United States Patent [19]

Kobari

[11] 4,445,076
[45] Apr. 24, 1984

[54] CONTROL SYSTEM FOR SYNCHRONOUS MOTOR EMPLOYED AS SERVOMOTOR

[75] Inventor: Katsuo Kobari, Tokyo, Japan
[73] Assignee: Fanuc Ltd., Tokyo, Japan
[21] Appl. No.: 398,891
[22] Filed: Jul. 16, 1982

[30] Foreign Application Priority Data

Jul. 17, 1981 [JP]  Japan ............................. 56-110761

[51] Int. Cl.³ .......................................... G05B 11/12
[52] U.S. Cl. .................................. 318/690; 318/685; 318/254
[58] Field of Search ............... 318/687, 254, 685, 690, 318/661, 603; 340/347 SY

[56] References Cited

U.S. PATENT DOCUMENTS

| | | | |
|---|---|---|---|
| 3,546,560 | 12/1970 | Tippetts | 318/690 |
| 4,012,676 | 3/1977 | Giebler | 318/687 X |
| 4,334,180 | 6/1982 | Bramm et al. | 318/687 |
| 4,375,636 | 3/1983 | Stack et al. | 318/661 X |
| 4,384,242 | 5/1983 | Ono | 318/661 X |
| 4,404,509 | 9/1983 | Hartwig | 318/685 |

Primary Examiner—B. Dobeck
Attorney, Agent, or Firm—Staas & Halsey

[57] ABSTRACT

A control system for a synchronous motor which is employed as a servomotor, wherein a pulse coder is employed for detection of the absolute position of one of the field poles of the motor, the absolute position being a component of the input signals for generating a poly-phase alternating current voltage which generates a rotating field maintaining a fixed amount of phase difference with respect to the absolute position of one of the field poles of the motor, thereby the synchronous motor is controlled to run maintaining a fixed amount of internal phase angle of e.g. $\pi/2$ for the entire operation period, wherein the improvement is that the pulse coder has two pulse coder elements, one of which detects the absolute position of one of the field poles of the motor and the other of which generates incremental pulses during each interval of the signals representing the absolute position of one of the field poles, thereby a larger amount of resolving power is realized for the pulse coder, ultimately improving the performance of the control system.

4 Claims, 5 Drawing Figures

CONTROL SYSTEM FOR SYNCHRONOUS MOTOR EMPLOYED AS SERVOMOTOR

FIELD OF THE INVENTION

The present invention relates to a control system for a synchronous motor which is employed as a servomotor. More specifically, the present invention relates to an improvement applicable to a pulse coder which is employed for detection of the angular position of field poles of a synchronous motor with respect to the windings of the stator of the synchronous motor.

BACKGROUND OF THE INVENTION

In the prior art, a permanent magnet field type direct current motor is prevailingly employed as a servomotor. A tendency is recognized, however, that a permanent magnet revolving field type synchronous motor is employed as a servomotor. This is because a synchronous motor inherently has various advantages and features pointed out below. (a) Since a synchronous motor is a brushless motor, it is free from potential disturbance for wireless communication systems. (b) Since no commutator is required, it is free from the problem of wear. (c) Since the rotor of a synchronous motor is durable, quick acceleration and/or retardation are or is allowed for a synchronous motor, and it is relatively easy to adjust the dynamic balance of the rotor thereof. In addition to the foregoing advantages and features inherent to a synchronous motor, an additional advantage briefed below is a parameter to enhance the employment of a synchronous motor as a servomotor. Namely, a control system briefed below can be applied to a synchronous motor. (a) Firstly, a means for detection of the angular position of a rotary object, such as a resolver, a pulse coder, etc, is employed for monitoring the angular position of a field pole. (b) Secondly, following the angular position detected above, a poly-phase alternating current voltage which generates a rotating field which is in the leading phase by e.g. $\pi/2$ in terms of electric angle ahead of the field pole, is generated. As a result, the frequency and phase of the poly-phase alternating current voltage follow the rotation of the rotor. (c) Thirdly, the amplitude of the poly-phase alternating current is selected to meet the amount of torque required. (d) Fourthly, when the poly-phase alternating current is supplied to a synchronous motor, the synchronous motor continues rotation with a fixed amount of internal phase angle of e.g. $\pi/2$ in terms of electric angle.

A slightly detailed description will be presented below for the foregoing control system applicable to a synchronous motor.

The torque T of a synchronous motor is given by the following formula:

$$T = \frac{V \cdot E}{X} \sin\delta$$

wherein,
V represents a voltage applied to the stator,
E represents an induced voltage,
X represents the inductance of the stator, and
$\delta$ represents an internal phase angle.

Provided the amount of internal phase angle is kept at $\pi/2$, the amount of $\sin\delta$ is kept at 1 (one). On the other hand, since the amount of the stator inductance X depends on the frequency of the applied voltage, and since the amount of the induced voltage depends on the rotation speed of the rotor, the influence of the stator inductance X and the induced voltage E offsets each other. As a result, the torque T is determined depending on the amount of the applied voltage or the amount of the stator current, resultantly simplifying the torque regulation.

Supposing the angular position of a rotor specifically of a field pole is continually monitored, it is possible to generate an alternating current signal $A\cos\omega t$ which is kept in the same phase with the rotation of a rotor. This in-phase signal can be readily converted to other alternating current signals including (a) $A\sin\omega t$ which is in the leading phase by $\pi/2$ with respect to the rotor, (b)

$$A\sin\left(\omega t - \frac{2\pi}{3}\right)$$

which is in the lagging phase by $\frac{2}{3}\pi$ with respect to $A\sin\omega t$, and (c)

$$A\sin\left(\omega t - \frac{4\pi}{3}\right)$$

which is in the lagging phase by $\frac{2}{3}\pi$ with respect to $$A\sin\left(\omega t - \frac{2\pi}{3}\right).$$

The foregoing three alternating current signals can be employed as a set of trigger signals to produce a three-phase alternating current voltage which is generated by means e.g. of an inverter and which generates a rotating field which is in the leading phase by $\pi/2$ with respect to the rotor. Therefore, application of this three-phase alternating current voltage to a synchronous motor causes the motor to continue operation maintaining the fixed amount of internal phase angle of $\pi/2$ for the entire operation period, regardless of variation of the rotating speed. Further, it is possible to maintain a rotor at an arbitrary angular position, if the frequency of the three-phase alternating current voltage is decreased to and maintained at zero.

As a result, combined application of an ordinary speed control system which determines a desirable amount of current or torque and the foregoing control system, enables the motor to be controlled in the digital manner or precisely by the angle corresponding to the cumulative frequency applied to the stator. In other words, the synchronous motor receives a poly-phase alternating current voltage of which the amplitude corresponds to the torque which is determined by the ordinary speed control system for the purpose of causing the motor to follow the positional and/or speed reference signal and of which the phases are sufficient to keep the internal phase angle at a fixed amount, e.g. $\pi/2$, in terms of electric angle during the entire operation period wherein the motor may increase and/or decrease the rotating speed following an external command.

In order to improve the accuracy of the foregoing control system, it is essential to accurately detect the absolute angular position of each of the permanent magnet field poles which are components of a rotor. Namely, an accurate means for detection of an absolute angular position of a rotary object is essential. Supposing this means is realized employing a pulse coder based on the pure binary code system, an extremely large number of bits is required for the pulse coder. For example, 13 bits are required to split 360 degrees into 8,192 angular portions, and 14 bits are required to split 360 degrees into 16,384 angular portions. It is not easy to produce a pulse coder having such a large number of bits. Even if a pulse coder having a large number of bits can be produced, the pulse coder may be prone to malfunction, resulting in lowered reliability.

OBJECT AND SUMMARY OF THE INVENTION

An object of the present invention is to provide a control system for a synchronous motor employed as a servomotor which employs a pulse coder which has a modest number of bits but has a large resolving power for the purpose of enhancing the possibility of realizing the various potential advantages and features inherent to a synchronous motor employed as a servomotor.

The other object of the present invention is to provide a control system for a linear synchronous motor employed as a linear servomotor which employs a linear pulse coder which has a modest number of bits but has a large resolving power for the purpose of enhancing the possibility of realizing the various potential advantages and features inherent to a linear synchronous motor employed as a linear servomotor.

To achieve the first of the foregoing objects, a control system for a synchronous motor employed as a servomotor in accordance with the present invention is provided with:

(a) a pulse coder having two independent pulse coder elements including (i) a first pulse coder element which is produced by splitting an angle which corresponds to one pair of the field poles of the synchronous motor into a predetermined number of angular portions utilizing some code system to make it possible to identify the absolute angular position of each of the angular portions, e.g. into 8 through 64 portions, provided 3 through 6 bits are selected based on the pure binary code system, so that the first pulse coder element has one or more trains of angular portions each of which represents each of the bits based on some code system and generates signals which represent the absolute angular position of one of the field poles of the synchronous motor with respect to a reference angular position determined following the structure of windings of the stator of the synchronous motor, (ii) a second pulse coder element which is produced by splitting each of the angular portion or each bit of the first pulse coder element into a predetermined number of smaller angular portions e.g. several ten through several hundred smaller angular portions without utilizing any code system, so that the second pulse coder element has a train of smaller angular portions of e.g. several ten through several hundred smaller angular portions and generates incremental pulses corresponding to each of the smaller angular portions, (iii) thereby a combination of the foregoing two pulse coder elements readily realizes a large amount of resolving power e.g. as high as 10,000 divisions for the angle corresponding to one pair of the field poles, (b) an arithmetic unit having (i) a means to recognize the signals generated by the first pulse coder element, (ii) a counter to count the incremental pulses generated by the second pulse coder element, the counter being triggered by a change of the signals generated by the first pulse coder element, (iii) a means to detect the absolute angular position of one of the field poles with respect to the reference angular position determined following the windings of the stator of the synchronous motor at a scale corresponding to the interval of the incremental pulses, (iv) and a means to generate a first trigonometrical function signal following the absolute angular position of one of the field poles with respect to the reference angular position determined following the windings of the stator of the synchronous motor and one or more other trigonometrical function signals having a predetermined amount of phase difference from one another with respect to the first trigonometrical function signal, and (c) an alternating current voltage generator, such as an inverter composed of power transistors, gate turn-off thyristors, etc., which is triggered by the first trigonometrical function signal and the one or more other trigonometrical function signals generated in the foregoing arithmetic unit and which generates a poly-phase alternating current voltage of which each component varies the frequency from zero to a predetermined amount but which maintains a predetermined amount of phase difference with respect to the absolute angular position of one of the field poles of the stator of the synchronous motor, whereby the synchronous motor is allowed to run maintaining a predetermined amount of internal phase angle regardless of the rotation speed thereof.

More specifically, the first pulse coder element is responsible for detecting the absolute angular position, and the second pulse coder element is responsible for detecting the relative angular position. Upon initiation of operation, the absolute angular position of a rotor is detected. Thereafter, the number of incremental pulses is counted to be added to or reduced from the coded number detected above which represents the absolute angular position of a rotor, and detection of the absolute angular position is continued in the incremental scale. The absolute angular position of the rotor detected above can be expressed in the form of e.g. Acos $\omega t$ representing a trigonometrical function having the same frequency and phase as the rotation of the rotor. Following the equation, a plurality of trigonometrical functions all of which have the same frequency but each of which has a phase different from one another by a certain amount of electrical angle, is produced by means of an arithmetic unit. The plurality of trigonometrical functions is input to an alternating current voltage generator to be allowed to function as trigger signals for production of a poly-phase alternating current voltage which generates a rotating field which is in the leading phase by e.g. $\pi/2$ with respect to the rotor. When this poly-phase alternating current voltage is applied to a synchronous motor, the synchronous motor runs with a fixed amount of internal phase angle of e.g. $\pi/2$ for the entire operation period. The amplitude of the poly-phase alternating current voltage is selected to be sufficient for generating a torque of which the amount is appropriate to cause the rotation speed of the synchronous motor to change or to stay unchanged following a command.

It is ordinary that a pulse coder is directly coupled with a synchronous motor, so that the pulse coder may have plural trains of angular portions of the first pulse coder element, except for a two-pole motor. In other words, a pulse coder employed for a four-pole motor has two sets of the train of which the structure is identical to each other.

In case of the disc type pulse coder, employment of 360 degrees for production of one unit of the first pulse coder element is an advantage, because it is effective to increase the resolving power. To realize this potential advantage, a pulse coder can be coupled with a synchronous motor via a means to change revolution speed such as a gear. In this case, it is realistic to select the speed reduction ratio identical to the number of pairs of the field poles.

A tendency is observed that a linear synchronous motor is increasingly employed as a servomotor. It is of course possible to produce a linear pulse coder. Therefore, the concept of the present invention can be readily realized for the control of a linear synchronous motor employed as a linear servomotor, as elaborated in the claim presented later.

The above and other objects, advantages and features of the present invention will become apparent from the following description of the foregoing embodiments thereof presented in conjunction with the accompanying drawings.

DETAILED DESCRIPTION

Figure 1:
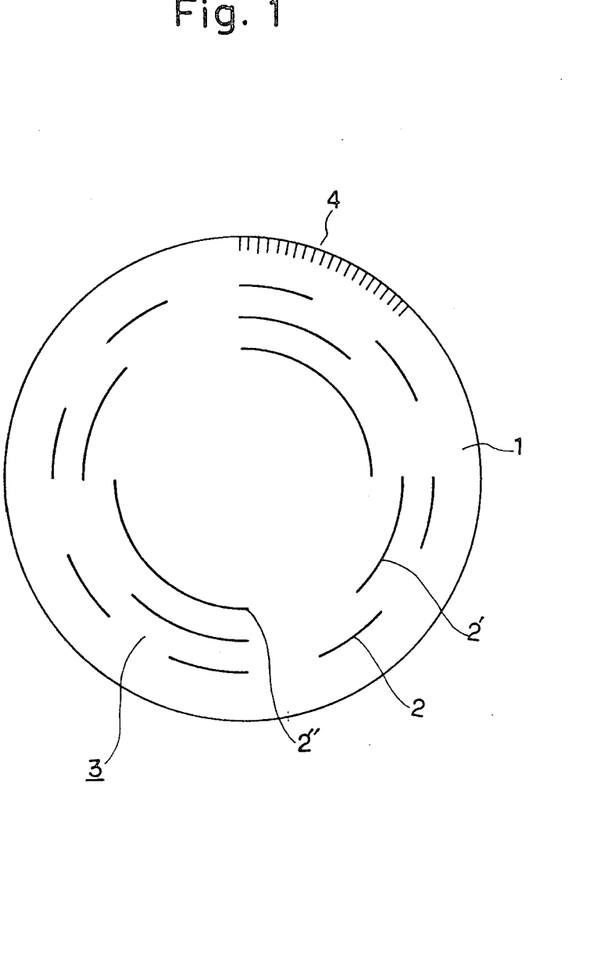
FIG. 1 is a schematic drawing of a pulse coder which is employed for a control system for a synchronous motor employed as a servomotor in accordance with one embodiment of the present invention

Referring to FIG. 1, a disc 1 composing a pulse coder is provided with a first pulse coder element having segments 2, 2', 2" representing 3 bits based on the pure binary code system. As a result, it enables detection of absolute angular positions for 8 independent areas, because $2^3$ is 8. In addition to the first pulse coder element 3, a second pulse coder element 4 is provided to further split each of the foregoing areas, representing $\frac{1}{8}$ of 360 degrees, into e.g. 20 areas or divisions. The ability of this second pulse coder element 4 is limited to detection of relative angular position. Therefore, the second pulse coder element 4 does not function until the first pulse coder element 3 proceeds to an angular area (segment) different from the one on which the first pulse coder element 3 is first located. Once the first pulse coder element 3 changes the angular area after a synchronous motor starts operation, the second pulse coder element 4 is allowed to initiate the operation. In other words, the number of incremental areas produced on the second pulse coder element 4 is thereafter counted to be added to or reduced from the coded number detected by the first pulse coder element 3, to continue detection of the absolute angular position in the incremental scale. In this embodiment, it is possible to detect the absolute angular position with a resolution of 160 divisions (8×20) for 360 degrees. This means that a pulse coder provided with three bits based on the pure binary code system and one additional element in accordance with one embodiment of the present invention is allowed to have a resolving power equivalent to that of a pulse coder having 9 bits solely based on the pure binary code system in accordance with the prior art.

Figure 2:
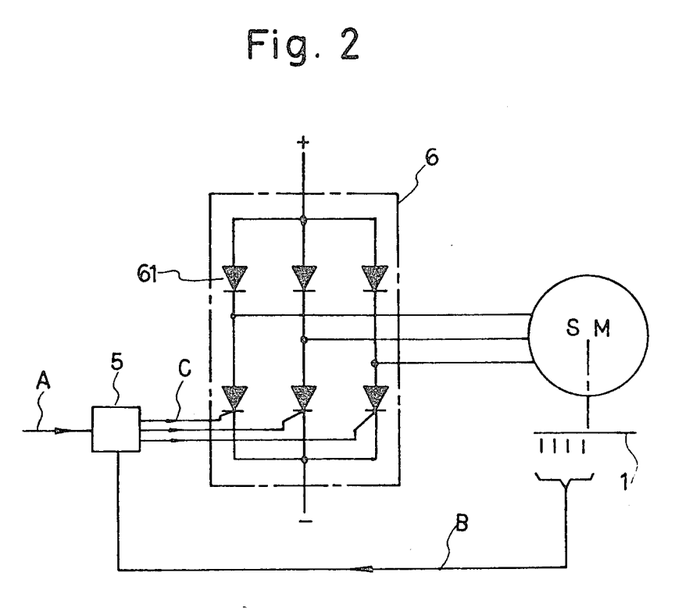
FIG. 2 is a block diagram showing the fundamental circuit for a control system for a synchronous motor employed as a servomotor in accordance with one embodiment of the present invention.

Referring to FIG. 2, the coded signal B which is detected by means of the pulse coder 1 and which represents the absolute angular position of the rotor, specifically of the field pole of the synchronous motor SM, is applied to an arithmetic unit 5. The arithmetic unit 5 additionally receives the other coded signal A, which represents the amount of torque which the synchronous motor SM is required to generate. The arithmetic unit 5 produces a set of trigger signals C which is applied to an alternating current voltage generator 6 which is an inverter composed of gate turn-off thyristors in this embodiment. Specifically, the trigger signals C are applied to the gates of the gate turn-off thyristors 61 for the purpose of causing the alternating current voltage generator 6 to generate a three-phase voltage which has the amplitude determined following the signal A and which has the phase determined following the signal B. Therefore, the three-phase voltage, when being applied to the synchronous motor SM, causes the stator of the motor SM to generate a rotating field which leads ahead of the rotor of the motor SM by a specific amount of electric angle e.g. $\pi/2$. As a result, the synchronous motor SM is caused to generate a torque determined following the torque signal A, while maintaining the amount of internal phase angle of e.g. $\pi/2$ with respect to the absolute angular position of the rotor of the motor SM detected by the pulse coder 1. In other words, the rotation speed of the motor SM can be increased, kept unchanged or decreased, while generating a required amount of torque. It is needless to emphasize that the rotor can be stalled precisely at a required angular position, while generating a required amount of torque, provided the frequency is selected to be zero for the alternating current voltage generator 6. Since a larger amount of resolving power is available for a pulse coder in accordance with this embodiment of the present invention than for a pulse coder available in the prior art, a more precise control is allowed for a synchronous motor employed as a servomotor in accordance with the present invention.

Figure 3:
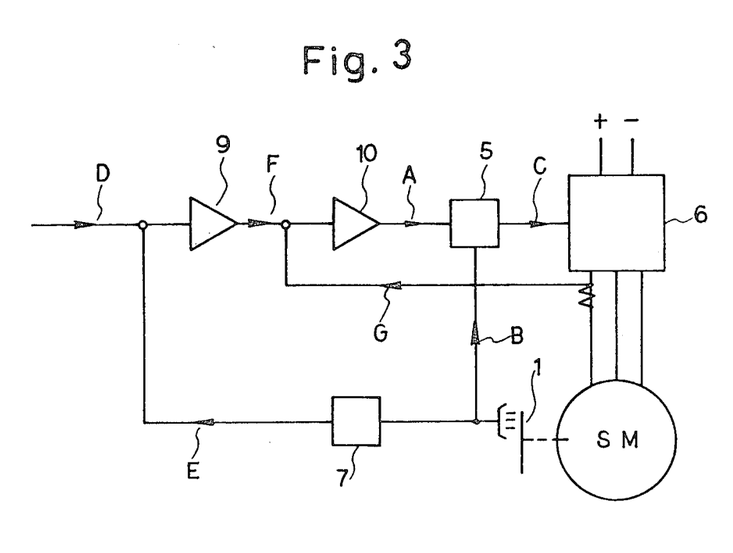
FIG. 3 is a block-diagram showing an application of a control system for a synchronous motor employed as a servomotor in accordance with one embodiment of the present invention.

FIG. 3 shows a block diagram of a case wherein (a) a control system for a synchronous motor employed as a servomotor in accordance with one embodiment of the present invention and (b) an ordinary control system which drives a synchronous motor to run at a required amount of rotation speed, bearing an arbitrary amount of load, are applied in combination. Referring to the figure, a speed command signal D which represents a rotation speed at which the synchronous motor SM is required to run is applied to an amplifier 9 of a speed feedback loop. The amplifier 9 of the speed feedback loop also receives a speed signal E which represents the speed of the synchronous motor SM and which is detected by a speed detector 7 which converts the digital information picked up by the pulse coder 1 to a speed signal E in the form of a voltage signal. The amplifier 9 outputs a current signal F to an amplifier 10 of a current feedback loop. The amplifier 10 of the current feedback loop also receives a current signal G representing the amount of current flowing in the synchronous motor SM. The amplifier 10 outputs a torque signal A to the arithmetic unit 5 which also receives the signal B which represents the absolute angular position of the rotor of the motor SM. The arithmetic unit 5 outputs a set of trigger signals C to the alternating current voltage generator 6 to cause the alternating current voltage generator 6 to generate a three-phase voltage which has the amplitude determined following the torque signal A which is determined following the difference between the speed command signal D and the speed signal E and which has the phase determined following the signal B representing the absolute angular position of the rotor of the motor SM. As a result, the motor SM is caused to precisely maintain the internal phase angle at e.g. $\pi/2$, while generating an amount of torque determined following the torque signal A. Ultimately, the motor SM is caused to run at a required rotation speed bearing an arbitrary amount of torque. Since a larger amount of resolving power is available for a pulse coder in accordance with this embodiment of the present invention than for a pulse coder available in the prior art, a more precise control is allowed for a synchronous motor employed as a servomotor in accordance with the present invention.

As described earlier, a disc type pulse coder in accordance with the present invention can be coupled either directly or indirectly with a synchronous motor. Each case is involved with the advantage inherent thereto. Specifically, in the former case, more reliability can be expected, and in the latter case, a larger magnitude of resolving power can be realized.

Further, a control system for a linear synchronous motor employed as a linear servomotor is available in which the concept is to utilize a linear pulse coder having two independent pulse coders including a first linear pulse coder element which is responsible for detecting the absolute longitudinal position of one of the field poles of the linear synchronous motor and a second linear pulse coder element which is responsible for generating incremental pulses in each of the unit intervals representing the absolute longitudinal positions of one of the field poles of the linear synchronous motor, thereby a larger amount of resolving power is realized by combination of the foregoing two longitudinal pulse coder elements.

Figure 4:
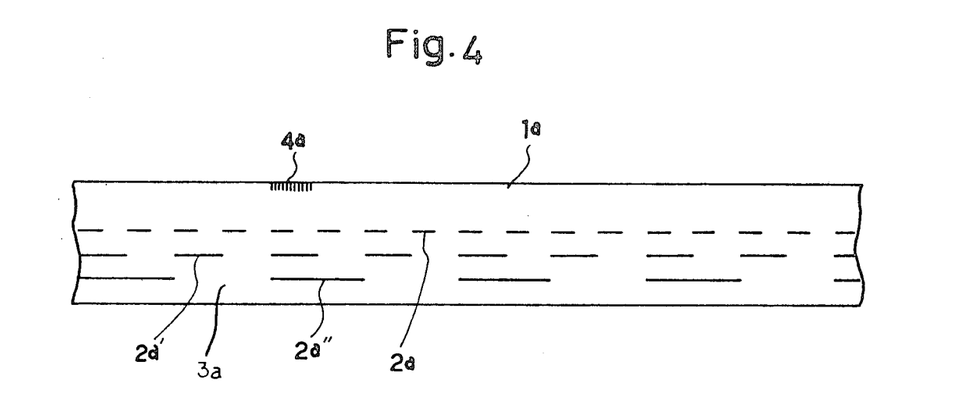
FIG. 4 is a schematic drawing of a linear pulse coder which is employed for a control system for a linear synchronous motor employed as a servomotor in accordance with the other embodiment of the present invention.

Referring to FIG. 4, a linear pulse coder 1a is provided with a first pulse coder element having areas 2a, 2a' and 2a" representing 3 bits based on the pure binary code system. One-cycle length of the area 2a" is determined to correspond to the pole pitch of the linear synchronouse motor employed, e.g. 40 mm. As a result, it enables detection of absolute positions for 8 independent areas in the aforementioned one-cycle length or one-pole pitch length, because $2^3$ is 8. In addition to the first pulse coder element 3a, a second pulse coder element 4a is provided to further split each of the foregoing areas representing ⅛ of the one-pole pitch length of the linear synchronous motor employed, into e.g. 5000 areas. The ability of this second pulse coder element 4a is limited to detection of relative position. Therefore, the second pulse coder element 4a does not function until the first pulse coder element 3a proceeds to an area different from the one on which the first pulse coder element 3a is first located. Once the first pulse coder element 3a changes the area after the linear synchronous motor starts operation, the second pulse coder element 4a is allowed to initiate the operation. In other words, the number of incremental areas produced on the second pulse coder element 4a is thereafter counted to be added to or reduced from the coded number detected by the first pulse coder element 3a, to continue detection of the absolute position in the incremental scale. This incremental scale detection is not limited by the aforementioned one-cycle length. In other words, endless detection is allowed for the entire length of the linear pulse coder 1a. In this embodiment, it is possible to detect the absolute position with the resolution of 4000 divisions (8×5000) for one-pole pitch length, e.g. 1 micrometer (40 mm/40000). This means that a linear pulse coder provided with three bits based on the pure binary code system and one additional element in accordance with the other embodiment of the present invention is allowed to have a resolving power equivalent to that of a pulse coder having 16 bits solely based on the pure binary system in accordance with the prior art.

Figure 5:
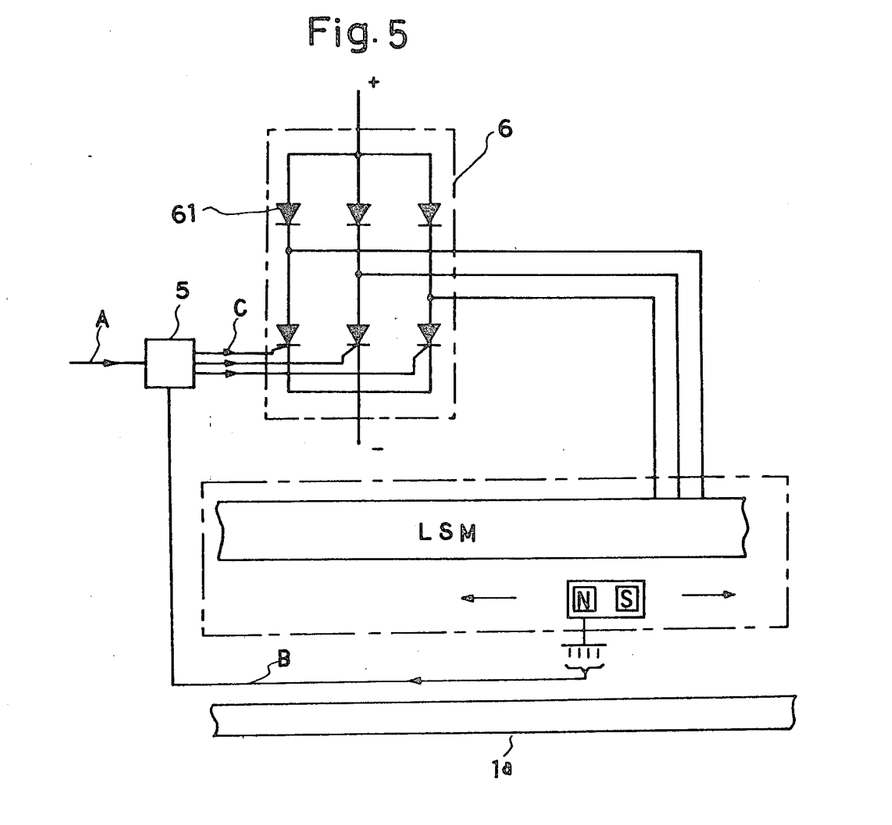
FIG. 5 is a block diagram showing the fundamental circuit for a control system for a linear synchronous motor employed as a servomotor in accordance with the other embodiment of the present invention.

Referring to FIG. 5, the coded signal B which is detected by means of the pulse coder 1a and which represents the absolute position of a slider or vehicle (shown by a box containing characters N and S in FIG. 5) specifically of the field pole magnet (shown by N or S in FIG. 5) of the linear synchronous motor LSM (shown by a chain line box in FIG. 5), is applied to an arithmetic unit 5. The arithmetic unit 5 additionally receives the other coded signal A, which represents the amount of thrust which the linear synchronous motor LSM is required to generate. The arithmetic unit 5 produces a set of trigger signals C which is applied to an alternating current voltage generator 6 which is an inverter composed of gate turn-off thyristors in this embodiment. Specifically, the trigger signals C are applied to the gates of the gate turn-off thyristors 61 for the purpose of causing the alternating current voltage generator 6 to generate a three-phase voltage which has the amplitude determined following the signal A and which has the phase determined following the signal B. Therefore, the three-phase voltage, when being applied to the linear synchronous motor LSM, causes the stator of the linear synchronous motor LSM to generate a shifting magnetic field which leads ahead of the slider or vehicle of the linear synchronous motor LSM by a specific amount of electric angle, e.g. $\pi/2$. As a result, the linear synchronous motor LSM is caused to generate a thrust determined following the thrust signal A, while maintaining the amount of internal phase angle of e.g. $\pi/2$ with respect to the absolute position of the slider or vehicle of the linear synchronous motor LSM detected by the linear pulse coder 1a. In other words, the shifting speed of the slider or vehicle of the linear synchronous motor LSM can be increased, kept unchanged or decreased, while generating a required amount of thrust. It is needless to emphasize that the slider or vehicle can be stalled precisely at a required position, while generating a required amount of thrust, provided the frequency is selected to zero for alternating current voltage generator 6. Since a larger amount of resolving power is available for a linear pulse coder in accordance with this embodiment of the present invention than for a linear pulse coder available in the prior art, more precise control is allowed for a linear synchronous motor employed as a servomotor in accordance with the present invention.

Accordingly, in accordance with the present invention, it is possible to utilize various advantages and features of a synchronous motor employed as a servomotor.

Further, it is possible to continue revision of the coded number representing the absolute angular position and which was determined by addition of the output of the second pulse coder element 4 to the output of the first pulse coder element 3, whenever the first pulse coder element 3 produces an output. However, if this revision is continued in excess of 360 degrees, it may not be realistic, because it requires a fairly complicated procedure.

The foregoing description has clarified that a control system for a synchronous motor employed as a servomotor which employs a pulse coder which has a modest number of bits but has a large of resolving power which is essential to realize the various potential advantages and features inherent to a synchronous motor employed as a servomotor is provided in accordance with the present invention.

Albeit the present invention has been described with reference to specific embodiments, this description is not meant to be construed in a limiting sense. Various other embodiments and/or modifications of the present invention will become apparent to persons skilled in the art upon reference to the description of the present invention. It is therefore contemplated that the claims will cover any such embodiments and/or modifications as fall within the true scope of the present invention.

What is claimed is:

1. A control system for a synchronous motor employed as a servomotor comprising:

a pulse coder having a first pulse coder element which has at least one train of angular portions of which the cumulative angle corresponds to one pair of the field poles of said synchronous motor and each of which is produced by splitting the cumulative angle of said angular portions to predetermined portions utilizing a code system to enable each of said angular portions to represent the absolute angular positions thereof, said first pulse coder element generating signals representing the absolute angular position of one of said field poles with respect to a reference angular position determined following the windings of the stator of said synchronous motor, and having a second pulse coder element which has a train of smaller angular portions of which the cumulative angle covers each of said angular portions of said train of said first pulse coder element and each of which is produced by splitting the cumulative angle of said smaller angular portions to predetermined portions, said second pulse coder element generating incremental pulses corresponding to each of said smaller angular portions, an arithmetic unit comprising a means to recognize said signals generated by said first pulse coder element, a counter to count said incremental pulses generated by said second pulse coder element, said counter being triggered by a change of said signals generated by said first pulse coder element, a means to detect the absolute angular position of one of said field poles with respect to said reference angular position determined following the windings of the stator of said synchronous motor at a scale corresponding to the interval of said incremental pulses, and a means to generate a first trigonometrical function signal following said absolute angular position of one of said field poles with respect to said reference angular position determined following the windings of the stator of said synchronous motor and at least one other trigonometrical function signal having a predetermined amount of phase difference with respect to said first trigonometrical function signal, and an alternating current voltage generator which is triggered by said first trigonometrical function signal and said at least one other trigonometrical function signal generated in said arithmetic unit and which generates a poly-phase alternating current voltage of which each component varies the frequency from zero to a predetermined amount but which maintains a predetermined amount of phase difference with respect to said absolute angular position of one of said field poles of the stator of said synchronous motor, whereby said synchronous motor is allowed to run maintaining a predetermined amount of internal phase angle regardless of the rotation speed thereof.

2. A control system for a synchronous motor employed as a servomotor defined in claim 1, wherein said pulse coder is coupled directly with said synchronous motor and the quantity of said trains of angular portions of said first pulse coder element is identical to the quantity of pairs of the field poles of said synchronous motor.

3. A control systems for a synchronous motor employed as a servomotor defined in claim 1, wherein said pulse coder is coupled with said synchronous motor with a reduction ratio identical to the number of pairs of the field poles of said synchronous motor and said first pulse coder element has one train of angular portions.

4. A control system for a linear synchronous motor employed as a linear servomotor comprising:

a linear pulse coder having a first linear pulse coder element which has at least one train of longitudinal areas of which the total length corresponds to one pair of the field poles of said linear synchronous motor and each of which is produced by splitting the total length of said longitudinal areas to predetermined portions utilizing a code system to enable each of said longitudinal portions to represent the absolute longitudinal positions thereof, said first linear pulse coder element generating signals representing the absolute longitudinal position of one of said field poles with respect to a reference longitudinal position determined followings the windings of said linear synchronous motor, and having a second linear pulse coder element which has a train of smaller longitudinal areas of which the total length covers each of said longitudinal areas of said train of said first linear pulse coder element and each of which is produced by splitting the total length of said smaller longitudinal areas to predetermined portions, said second linear pulse coder element generating incremental pulses corresponding to each of said smaller longitudinal areas, an arithmetic unit comprising a means to recognize said signals generating by said first linear pulse coder element, a counter to count said incremental pulses generated by said second linear pulse coder element, said counter being triggered by a change of said signals generated by said first linear pulse coder element, a means to detect the absolute position of one of said field poles with respect to said reference position determined following the windings of said linear synchronous motor at a scale corresponding to the interval of said incremental pulses, and a means to generate a first trigonometrical function signal following said absolute position of one of said field poles with respect to said reference position determined following the windings of said linear synchronous motor and at least one other trigonometrical function signal having a predetermined amount of phase difference with respect to said first trigonometrical function signal, and an alternating current voltage generator which is triggered by said first trigonometrical function signal generated in said arithmetic unit and which generates a poly-phase alternating current voltage of which each component varies the frequency from zero to a predetermined amount but which maintains a predetermined amount of phase difference with respect to said absolute position of one of said field poles of said linear synchronous motor, whereby said linear synchronous motor is allowed to run maintaining a predetermined amount of internal phase angle regardless of the speed thereof.

* * * * *

UNITED STATES PATENT AND TRADEMARK OFFICE
CERTIFICATE OF CORRECTION

PATENT NO. : 4,445,076

DATED : April 24, 1984

INVENTOR(S) : Katsuo Kobari

It is certified that error appears in the above-identified patent and that said Letters Patent is hereby corrected as shown below:

Column 2, line 21, "2/3 π" should be --2π/3--;
          line 29, "2/3 π" should be --2π/3--.
Column 3, line 53, "portion" should be --portions--.
Column 5, line 29, "invention" should be --invention,--.
Column 7, line 55, "synchronouse" should be --synchronous--.
Column 9, line 17, delete "of" (second occurrence).

Signed and Sealed this

Twenty-third Day of October 1984

[SEAL]

Attest:

GERALD J. MOSSINGHOFF

Attesting Officer      Commissioner of Patents and Trademarks